(12) United States Patent
Gorpynich et al.

(10) Patent No.: US 9,111,296 B2
(45) Date of Patent: Aug. 18, 2015

(54) METHODS AND SYSTEMS FOR CONTEXT-AWARE CAR DIAGNOSTICS AND COMMERCE

(71) Applicant: Cogniance, Inc., Menlo Park, CA (US)

(72) Inventors: Sergii Gorpynich, Menlo Park, CA (US); Vasyl Pasternak, Menlo Park, CA (US); Oleg Uzenkov, Menlo Park, CA (US)

(73) Assignee: COGNIANCE, INC., Menlo Park, CA (US)

( * ) Notice: Subject to any disclaimer, the term of this patent is extended or adjusted under 35 U.S.C. 154(b) by 0 days.

(21) Appl. No.: 14/594,197

(22) Filed: Jan. 12, 2015

(65) Prior Publication Data
US 2015/0134455 A1 May 14, 2015

(51) Int. Cl.
*A01B 1/00* (2006.01)
*G06Q 30/02* (2012.01)
*G07C 5/00* (2006.01)

(52) U.S. Cl.
CPC ............ *G06Q 30/0266* (2013.01); *G07C 5/006* (2013.01)

(58) Field of Classification Search
CPC ........ G01C 21/26; G01C 21/32; G01C 21/36; G01C 21/34; G01C 21/3629; G01C 21/3484; G01C 21/3492; G01C 21/3461; G01C 21/3679; G01C 21/3682; G01C 21/3608; G01C 21/3632
USPC ......... 701/426, 423, 425, 428, 430, 438, 439, 701/454, 462, 461
See application file for complete search history.

(56) References Cited

U.S. PATENT DOCUMENTS

| | | | |
|---|---|---|---|
| 2003/0137194 A1* | 7/2003 | White et al. ................. | 307/10.1 |
| 2005/0222933 A1* | 10/2005 | Wesby ............................ | 705/36 |
| 2008/0021605 A1* | 1/2008 | Huber et al. .................... | 701/30 |
| 2010/0228404 A1* | 9/2010 | Link et al. ......................... | 701/1 |
| 2013/0006769 A1* | 1/2013 | Schalk et al. ............... | 705/14.54 |
| 2013/0246135 A1* | 9/2013 | Wang ........................... | 705/14.4 |

* cited by examiner

*Primary Examiner* — Richard Camby
(74) *Attorney, Agent, or Firm* — Georgiy L. Khayet

(57) ABSTRACT

Digital signage systems and methods are provided for advertising and vehicle maintenance-related content based on vehicle telematics data. Example method steps include receiving vehicle telematics data from an in-vehicle telematics device, creating a content production request based on the vehicle telematics data, retrieving context-aware information based on the content production request from a local database or a remote networked resource, creating a digital signage message based at least in part on the context-aware information and at least one predetermined rule, and causing display of the digital signage message on one or more displays.

19 Claims, 7 Drawing Sheets

METHODS AND SYSTEMS FOR CONTEXT-AWARE CAR DIAGNOSTICS AND COMMERCE

FIELD

This disclosure relates to digital signage systems and, more particularly, to digital signage systems and methods for providing advertisement content and vehicle maintenance-related content based on vehicle telematics data.

BACKGROUND

Traditionally, digital signage systems are used to display advertisements in public venues such as stadiums, convention centers, airports, transit stations, subways stations, individual subway cars, buses, commercial buildings, office buildings, shopping malls, retail outlets, and so forth. These systems can help to provide advertisements and information to the public by employing dynamic signage involving various predetermined rules to be triggered by specific events. In particular, dynamic signage can allow for video advertisements and messages to be displayed on electronic displays, typically with the purpose of delivering targeted messages at specific locations, specific times, and for specific individuals. The digital content displayed by dynamic signage systems can be programmed and updated on a real time-basis.

Existing digital signage systems can be interactive. These systems may include video cameras operable to detect the presence of individuals near a display or certain venue to initiate displaying advertising content. Some existing interactive digital signage systems include touch screens to provide interactive information inquiry service. However, there are a number of limitations associated with interactive digital signage systems, especially in the vehicle maintenance area.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present technology relates to systems and methods for digital signage that provide advertising content and/or vehicle maintenance-related content based on acquired vehicle telematics data and predetermined rules. More specifically, these systems can include at least one in-vehicle telematics device which is embedded into a vehicle for aggregating vehicle telematics data. The in-vehicle telematics device can communicate with a digital signage device automatically and wirelessly when the vehicle comes into a predetermined proximity area of the device. Notably, there can be provided multiple digital signage devices, with each of them located at different locations such as parking lots, gas stations, retail stores, drive-in restaurants, vehicle maintenance service stations, car dealerships, motels, and so forth. When the digital signage device receives vehicle telematics data, it can generate custom text, image, video, audio, and/or multimedia messages based on the vehicle telematics data and predetermined rules. The generated message may also include data acquired from local or networked resources (e.g., web resources) based on vehicle telematics data or specific search requests created based on vehicle telematics data. Further, digital signage messages are caused for display to specific individuals. In one example, one digital signage message can be displayed on a display device, such as an advertising panel located in proximity of the vehicle such as at a parking lot, a gas station, or a drive-in restaurant where the message can be readily available to a driver of the vehicle. In another example, the same or a second digital signage message can be provided on a mobile device of the driver. In yet another example, the same or a third digital signage message can be provided on a mobile device of maintenance personnel or any other possible service performer other than the driver.

According to one illustrative embodiment of the present disclosure, there is provided a method which can be implemented by means of a computing device. One example of the computing device includes at least one processor and memory storing process-readable instructions causing the computing device to implement method steps. In particular, the method can comprise the steps of receiving vehicle telematics data from an in-vehicle telematics device, where the vehicle telematics data is associated with a vehicle of a user. The method can further comprise the steps of creating a content production request based on the vehicle telematics data and retrieving, from a local database or a remote networked resource, context-aware information based on the content production request. The method can further comprise the steps of building a digital signage message based at least in part on the context-aware information and at least one predetermined rule and causing a display of the digital signage message on one or more displays.

In some embodiments, the vehicle telematics data includes at least one of a user identifier associated with the vehicle or a vehicle identifier associated with the vehicle. Vehicle telematics data can also include one or more of the following: a vehicle make, a vehicle model, a fuel level, a fuel type, one or more vehicle error codes, one or more vehicle malfunction alerts, historical data concerning traveled distances, historical data concerning traveled directions, and user preferences.

In some embodiments, the step of receiving the vehicle telematics data can be performed automatically when the vehicle is located within a predetermined distance from the computing device or a wireless transceiver. Furthermore, the content production request may include at least part of the vehicle telematics data.

In some embodiments, context-aware information may comprise vehicle diagnostics information, advertisements, maintenance recommendations related to vehicle maintenance services, and/or purchase recommendations related to one or more products or one or more services associated with the vehicle. In some embodiments, one or more displays comprise at least one digital billboard, handheld computing device, or a mobile terminal.

In some embodiments, the step of building the digital signage message based at least in part on the context-aware information and at least one predetermined rule may comprise building a first digital signage message based on the context-aware information and a first predetermined rule and building a second digital signage message based on the context-aware information and a second predetermined rule, where the first digital signage message differs from the second digital signage message, and where the first digital signage message and the second digital signage message are associated with the vehicle. Moreover, the step of causing display of the digital signage message on the one or more displays may comprise causing display of the first digital signage message on a first display and causing display of the second digital signage message on a second display, where the first display differs from the second display.

In some embodiments, the method may further include the steps of maintaining a user profile associated with the vehicle and updating the user profile with the vehicle telematics data. The method may further include the step of updating a loyalty account associated with the user profile based on the vehicle telematics data or the content production request. In some embodiments, the step of building the digital signage message may further be based on the user profile.

In yet more embodiments, the method may further include the steps of causing execution of a financial transaction using monetary or non-monetary instruments associated with the user based on the vehicle telematics data or the content production request. The method may further include the step of generating the context-aware information based on the content production request, one or more content management rules, and one or more templates.

In further example embodiments, steps of method(s) described herein may be stored on a computer readable storage medium having a program embodied thereon, with the program executable by a processor in a computing device. In yet further exemplary embodiments, modules, systems, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
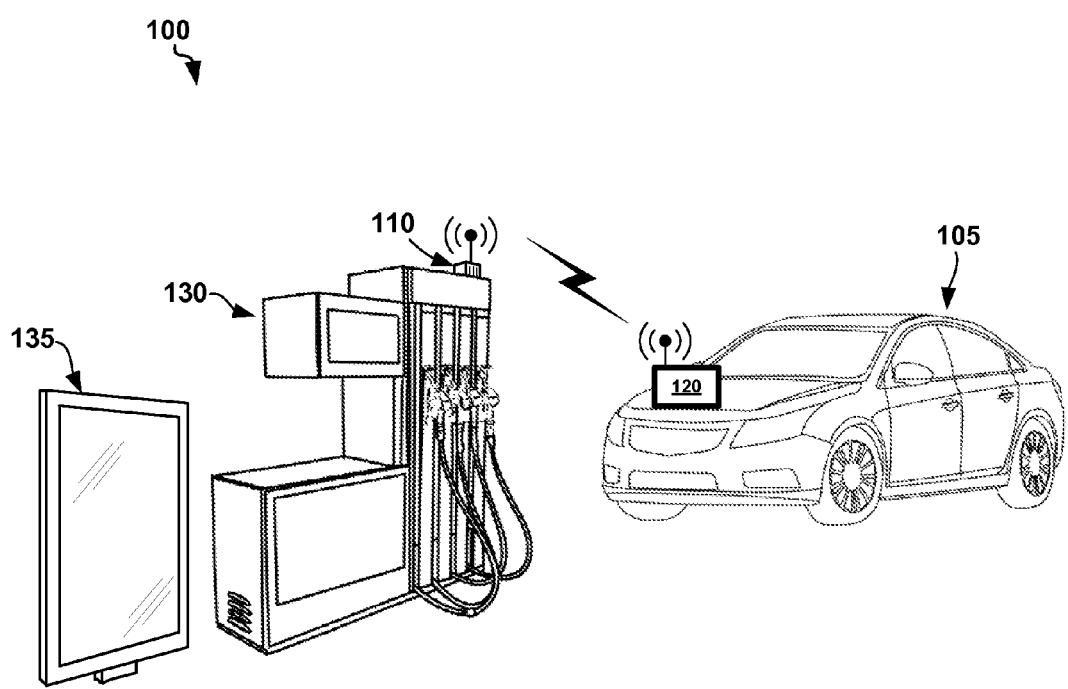
FIG. 1 shows a high-level interaction scheme between a vehicle and a digital signage device.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

INTRODUCTION

As outlined above, embodiments of the present disclosure are directed to processor-implemented methods for digital signage involving generation of custom digital signage messages based on vehicle telematics data and predetermined rules. These methods can enable multiple context-aware scenarios for remote vehicle diagnostics, driver assistance, on-time vehicle maintenance, advertising, and commerce. Custom digital signage messages can be displayed on a number of displays including advertising panels, digital signage device displays, and mobile devices, depending on a particular scenario. Vehicle telematics data can be automatically and wirelessly acquired from an in-vehicle telematics device upon detection of a proximity event, which is triggered when the vehicle comes within a predetermined distance of the digital signage device or its wireless transceiver, or when the vehicle arrives at a predetermined geographical location. As will be explained below in more detail, some context-aware scenarios may require a search for and retrieval of particular data from local or remote storage resources based on a particular scenario and vehicle telematics data. Accordingly, these methods for digital signage can provide for an intelligent solution that can be easily customized for specific information delivering or advertising needs and enhance a driver's experience upon visiting gas stations, parking lots, vehicle maintenance service stations, drive-in restaurants, motels, retail stores, or any other places of interest where digital signage devices can be employed.

Embodiments of the described methods and systems are presented below with reference to the figures of drawings, where like reference numerals are used to refer to like elements throughout. In the following description, for purposes of explanation, numerous specific details are set forth in order to provide a thorough understanding of embodiments. It may be evident, however, that such embodiments may be practiced without these specific details. In other instances, well-known structures, systems and devices are shown in block diagram form in order to facilitate describing one or more embodiments.

FIG. 1 shows a high-level interaction scheme 100 between a vehicle 105 and a digital signage device 110. According to this illustrative embodiment, vehicle 105 is equipped with an in-vehicle telematics device 120, which automatically aggregates various vehicle telematics data and upon occurrence of a proximity event, wirelessly transmits the vehicle telematics data to digital signage device 110. In the example shown, the proximity event is triggered when the vehicle 105 arrives at a gasoline station 130.

Upon receipt of vehicle telematics data, digital signage device 110 can generate a displayable custom digital signage message based at least in part on the vehicle telematics data and predetermined rules. The message can be built using local resources or remote (networked) resources using a content manager and/or content builder. The message may include text, images, videos, and/or audio content. Accordingly, in this example embodiment, the message is displayed on a billboard 135 for the vehicle driver or vehicle passengers. For instance, this message may include advertisement content, vehicle telematics data, processed vehicle telematics data, suggestions, or recommendations such as purchase recommendations or service recommendations. In some other embodiments, the messages can be displayed on a mobile device of the driver or on a mobile device of a particular service provider instead of the billboard 135.

This approach provides for multiple context-aware scenarios. For example, in one illustrative embodiment, the message displayed on the billboard 135 may include a recommendation for the driver to run a regular vehicle maintenance service at a certain service station or make a purchase of a particular motor oil because it is determined, based on the vehicle telematics data, that the vehicle has gone over 20,000 miles since the last maintenance service. In another example, the billboard 135 may display a personalized message for the driver to enroll in a loyalty program associated with this particular gas station because acquired vehicle telematics data reveals that the driver is not enrolled. In yet another example, no message is displayed at all, but the digital signage device 110 facilitates a financial transaction such as a payment for the gas purchased at the gasoline station 130. These and other example embodiments are explained in greater detail below.

System Architecture

Figure 2:
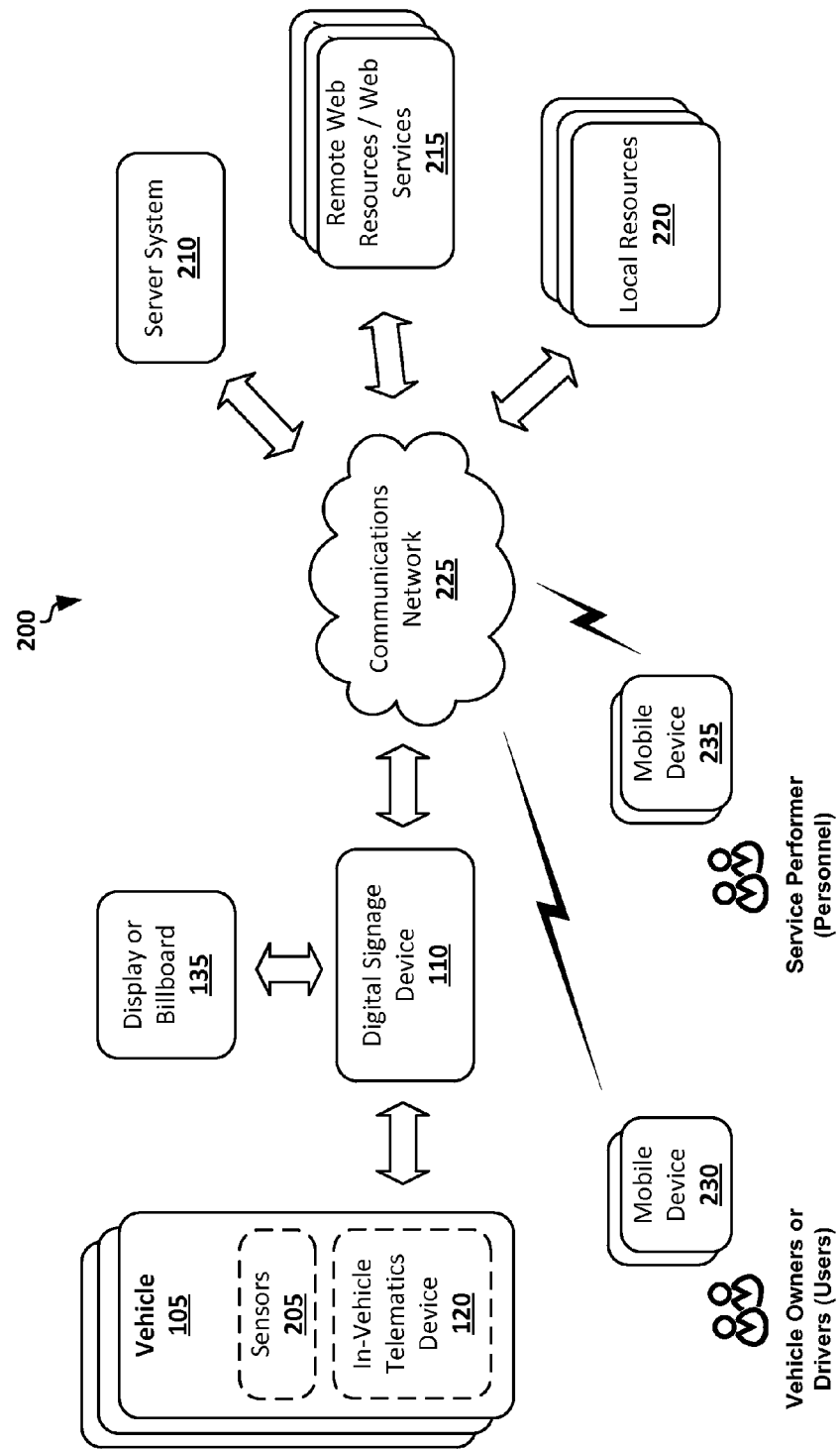
FIG. 2 shows a system architecture suitable for implementing methods for digital signage.

FIG. 2 shows a high-level block diagram of a system architecture 200 suitable for implementing methods for digital signage according to embodiments of the present disclosure. As shown in FIG. 2, there are provided one or more digital signage devices 110, each of which can be located at disparate geographical locations. As discussed above, digital signage devices 110 can be employed at gasoline stations, vehicle service stations, drive-in restaurants, drive-in banks, retail stores, parking lots, and so forth. In some embodiments and as shown in FIG. 2, digital signage devices 110 can be operatively connected to one or more billboards 135 or electronic displays for displaying generated messages. The specifics of digital signage devices 110 are provided in FIG. 4 below.

A vehicle 105 can be equipped with an in-vehicle telematics device 120 which is operatively connected to various sensing devices and detectors, collectively called sensors 205. In some examples, in-vehicle telematics device 120 can be connected to or be an integral part of an in-vehicle computer, onboard computing system, or built-in infotainment system. In any case, in-vehicle telematics device 120 can automatically aggregate and store vehicle telematics data associated with the vehicle 105 and, optionally, with the driver or a vehicle owner.

The term "vehicle telematics data," as used herein, may refer to multiple disparate parameters and information including, but not limited to, a vehicle identifier (e.g., VIN), driver identifier, vehicle make, vehicle model, vehicle year, fuel level, fuel type, oil level, oil type, vehicle error code, vehicle malfunction alert, historical data about traveled distances, historical data concerning traveled routes, mileage data, miles per gallon (MPG), or any combination thereof. The term "vehicle," as used herein, can refer to various motorized transportation means including an automobile, car, bus, truck, motorcycle, motorized bicycle, train, plane, boat, and so forth.

Communication between the digital signage devices 110 and in-vehicle telematics device 120 can be performed wirelessly using Bluetooth®, iBeacon®, Wi-Fi®, IEEE 802.11 standards, or any other suitable proprietary wireless communication standards. In other instances, in-vehicle telematics device 120 can communicate with digital signage devices 110 using one or more cellular networks. In yet other examples, wired communications are also possible. Communications between these devices can include two-way communications or one-way communication depending on particular needs.

According to embodiments of the present disclosure, communications between the digital signage devices 110 and in-vehicle telematics device 120 can be triggered automatically upon detection of a proximity event. The proximity event may be triggered when, for example, the vehicle 105 comes within a predetermined area nearby digital signage device 110 or its wireless transceiver. In other embodiments, however, the proximity event may be triggered when the vehicle 105 visits a certain geographical location (in this case, vehicle telematics data can be transmitted through a cellular network).

When digital signage device 110 acquires vehicle telematics data from in-vehicle telematics device 120, the digital signage device 110 can proceed with management of the content and creating one or more custom digital signage messages. These messages can be created by digital signage device 110 or server system 210. In other words, the messages can be created on site or remotely. Furthermore, messages can include content retrieved from local resources 215 or remote, networked resources 220. For example, inventory data, service descriptions, images, multimedia data, and so forth can be retrieved from local or remote resources and embedded into custom messages. Each of local resources 215 or networked resources 220 can include storage with a database, and processing means such as computing device, server or the like. In some embodiments, local resources 215 can be an integral part of digital signage device 110. In other embodiments, local resources 215 can be operatively connected to digital signage device 110.

The communications between digital signage device 110 and server system 210, local resources 215 and networked resources 220 can be implemented via one or more communications networks 225. The communications networks 225 may include, but are not limited to, the Internet, intranet, local area network (LAN), wide area network (WAN), cellular phone networks (e.g. Global System for Mobile communications network, packet switching communications network, circuit switching communications network, Long-Term Evolution communications network), Bluetooth® radio, iBeacon® radio, and an IEEE 802.11-based radio frequency network, among others.

As discussed above, custom digital signage messages can be displayed not only on billboards 135, but also on mobile devices or on mobile devices only. In particular, in some embodiments, digital signage device 110 or server system 210 may cause display of custom digital signage messages on mobile devices 230 of vehicle drivers or owners. In certain other embodiments, digital signage device 110 or server system 210 may facilitate displaying custom digital signage messages on mobile devices 235 of service providers such as service station personnel, gasoline station personnel, retail store workers, vehicle dealership personnel, and so forth. In yet further embodiments, the messages can be displayed both on mobile devices 230 and on mobile devices 235, whereas these messages can be the same, similar, or completely different messages. The term "mobile device," as used herein, may refer to cellular phones, smart phones, portable computing devices, laptop computers, tablet computers, personal digital assistants (PDAs), wearable computers, portable game consoles, and the like.

In-Vehicle Telematics Device

Figure 3:
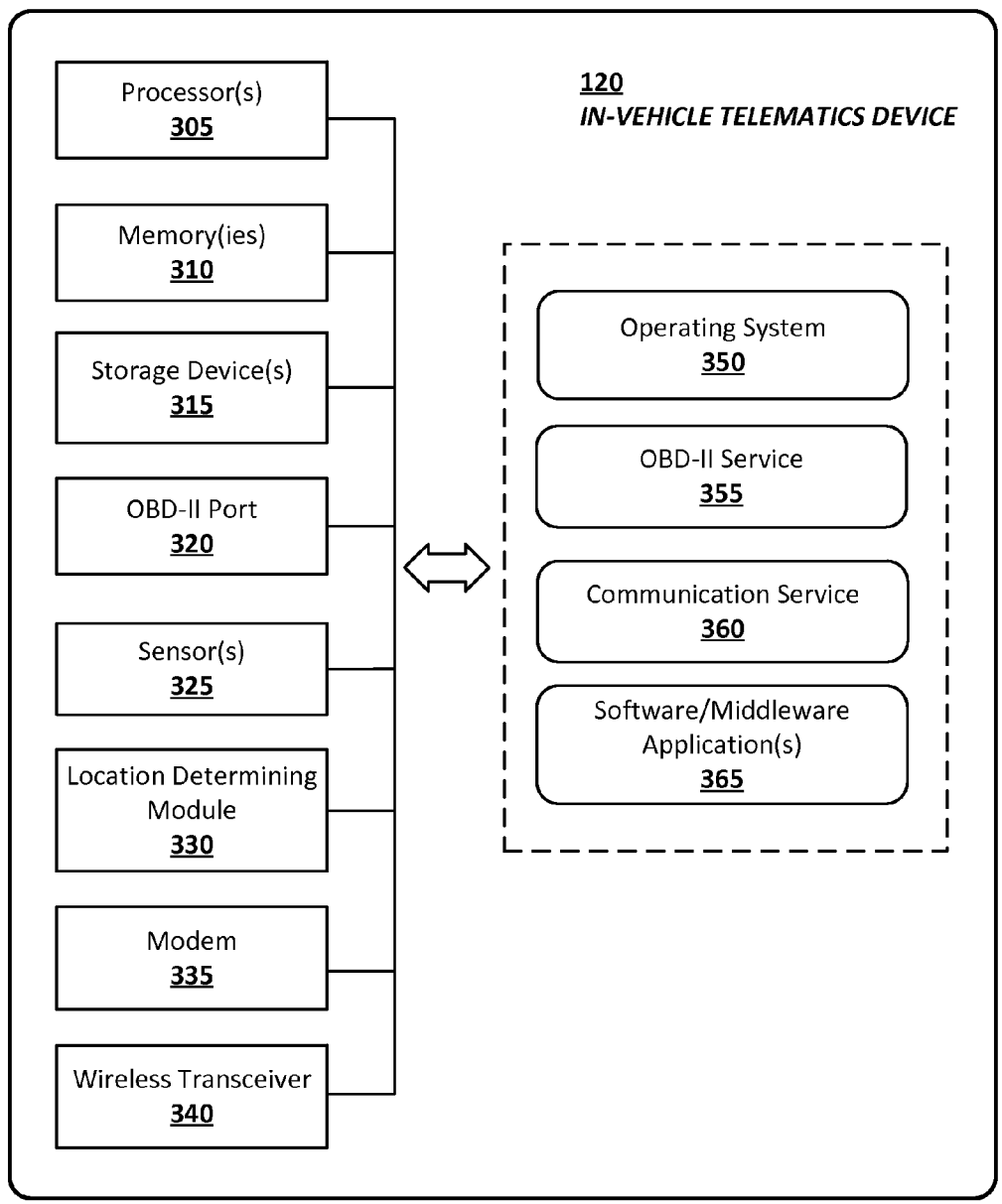
FIG. 3 shows an in-vehicle telematics device, according to one example embodiment.

FIG. 3 shows in-vehicle telematics device 120, according to one example embodiment. As shown in FIG. 3, in-vehicle telematics device 120 can include hardware and software modules. In general, in-vehicle telematics device 120 can include, relate, or be an integral part of one or more of a variety of types of devices and systems such as a general-purpose computer, in-vehicle computer, or in-vehicle infotainment system. In-vehicle telematics device 120 may also include one or more additional components not shown in FIG. 3 such as a housing, power supply, and communication bus, among others.

In the shown embodiment, in-vehicle telematics device 120 includes one or more processors 305, memory 310, one or more storage devices 315, On-board diagnostics II (OBD-II) port 320, one or more sensors 325, location determining module 330, modem 335, and wireless transceiver 340. One or more processors 305 are, in some examples, configured to implement functionality and/or process instructions for execution in the in-vehicle telematics device 120. For example, the processor 305 may process instructions stored in memory 310 and/or instructions stored on storage devices 315. Such instructions may specify components of an operating system 350, OBD-II service 355, communication service 360, or software applications 365. In some embodiments, the processor 305 includes an ARM-based microcontroller.

Memory 310, in some example embodiments, may include a non-transitory computer-readable storage medium or a computer-readable storage device. In some examples, memory 310 is a temporary memory, meaning that a primary purpose of memory 310 may not be long-term storage. Memory 310 may also refer to a volatile memory, meaning that memory 310 does not maintain stored contents when memory 310 is not receiving power. Examples of volatile memories include random access memories (RAM), dynamic random access memories (DRAM), static random access memories (SRAM), and other forms of volatile memories known in the art. In some examples, memory 310 is used to store program instructions for execution by the processors 305. Memory 310, in one example, is used by software modules such as a software, firmware, or middleware necessary for implementing methods for digital signage as disclosed herein.

One or more storage devices 315 can also include one or more transitory or non-transitory computer-readable storage media and/or computer-readable storage devices. In some embodiments, storage devices 315 may be configured to store greater amounts of information than memory 310. Storage devices 315 may further be configured for long-term storage of information. In some examples, the storage devices 315 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art such as Secure Digital (SD) cards, miniSD cards, microSD cards, and so forth. For example, storage devices 315 may aggregate and store vehicle telematics data.

Still referencing to FIG. 3, OBD-II port 320 refers to one or more communication ports suitable for communicating with various vehicle sensors 205 or an on-board computer. The term "OBD-II" refers to On-Board Diagnostics system for monitoring automobile parameters and trucks. In particular, OBD-II systems (e.g., sensors 205) monitor the vehicle's electrical and mechanical systems and generate vehicle telematics data that are processed by a vehicle's engine control unit (ECU) to detect any malfunction or deterioration in the vehicle's performance. Vehicle telematics data may become available to in-vehicle telematics device 120 through a standardized, serial 16-cavity connector known in the art as "OBD-II connector" or "OBD-II port." In some embodiments, OBD-II port 320 may include auxiliary modules such as an OBD-II interpreter chip. In yet other embodiments, OBD-II port 320 may be substituted with any other communications port.

Sensors 325 may include one or more of an accelerometer, detector, measuring device, or sensing device configured to sense various parameters associated with movement or operation of vehicle 105. This may include acceleration, deceleration, speed, distances, fuel, oil, temperature, voltage, and pressure parameters.

Location determining module 330 is configured to determine current geographical location of vehicle 105. For these ends, location determining module 330 may utilize a number of different methods including, for example, receiving and processing signals of Global Positioning Systems (GPS), GLONASS satellite navigation systems, or the Galileo satellite navigation system; utilizing multilateration of radio signals between radio towers (base stations); or utilizing geolocation methods associated with Internet Protocol (IP) addresses, Media Access Control (MAC) addresses, Radio-Frequency Identification (RFID), or other technologies.

Still referencing to FIG. 3, modem 335 is configured to communicate with server system 210 or other networked or web resources through the communications network 225. In some embodiments, modem 335 includes a network interface. Wireless transceiver 340 is configured to communicate with digital signage device 110 using near field communication (NFC), Bluetooth® radio, iBeacon® radio, IEEE 802.11-based radio frequency network, and so forth.

Operating system 350 may control one or more functionalities of in-vehicle telematics device 120 and/or components thereof. For example, the operating system 350 may interact with applications 365, and services 355, 360, and enable their use of hardware resources. Operating system 350 may include open source real-time operating system (RTOS) enabling a modular application framework. OBD-II service 355 provides interfacing technologies and standards such as ELM327 command set, extended command set, proprietary vendor-specific commands over CAN protocol, and so forth. Software or middleware implemented applications 365 may execute or facilitate execution of the methods for digital signage as disclosed herein. In particular, these applications may provide API (Application Programming Interface) based communication enabling interaction with digital signage device 110, local or networked services.

Digital Signage Device

Figure 4:
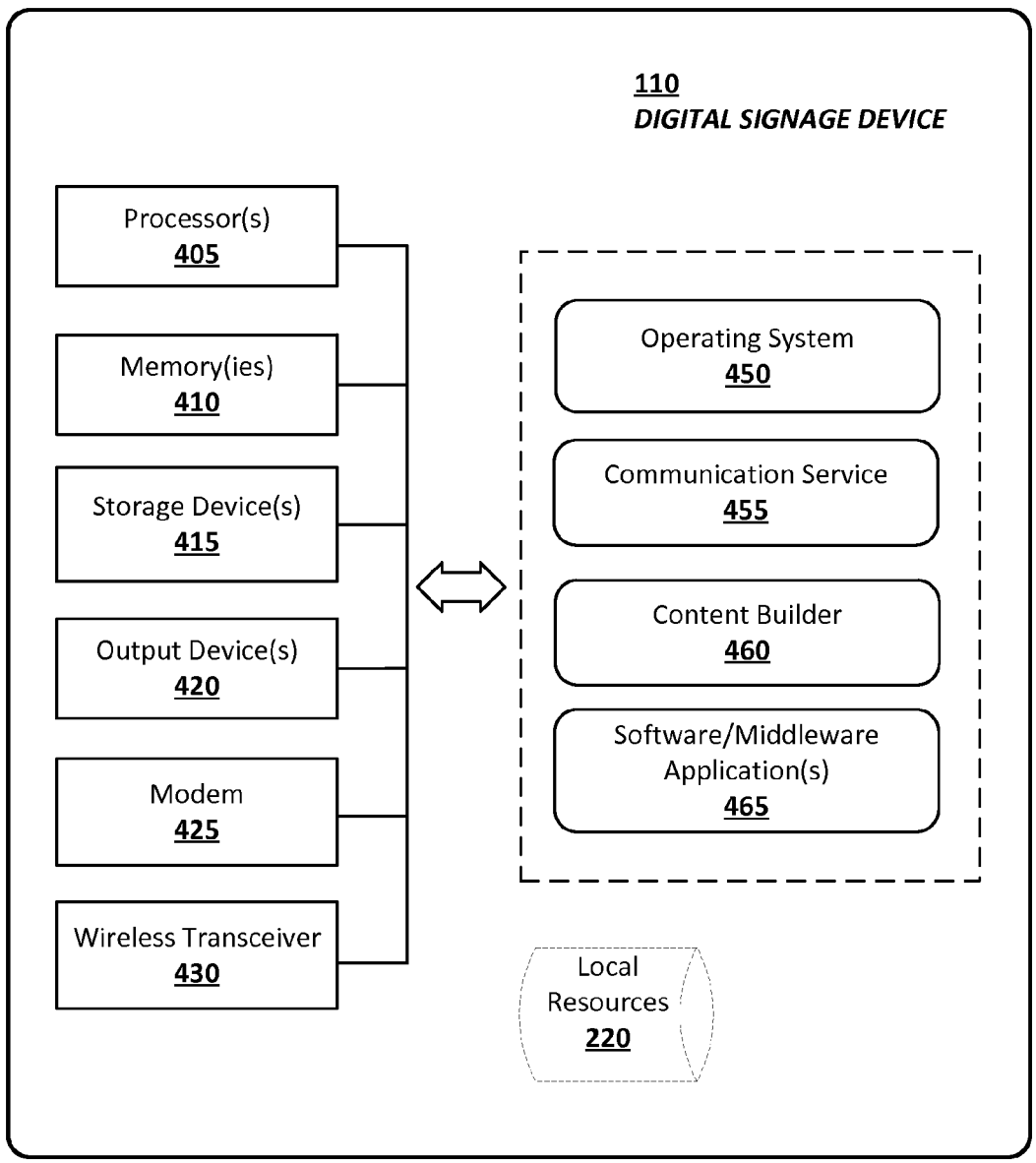
FIG. 4 shows a diagram of a digital signage device, according to one example embodiment.

FIG. 4 shows a high-level block diagram of digital signage device 110, according to one example embodiment. In general, digital signage device 110 may include, relate, or be an integral part of one or more of a variety of types of devices and systems such as a general-purpose computer, desktop computer, laptop computer, tablet computer, mobile device, server, web server, Apache HTTP server, computer network, network service, cloud computing service, web service, website hosting service, and so forth. In some embodiments, the digital signage device 110 has cloud-based implementation meaning it at least partly integrates multiple web servers and their services. Digital signage device 110 may also include one or more additional components not shown in FIG. 4 such as a housing, power supply, communication bus, and so forth.

As shown in FIG. 4, digital signage device 110 includes multiple hardware and software modules. In particular, digital signage device 110 includes one or more processors 405, memory 410, one or more storage devices 415, one or more optional output devices 420, modem 425, and wireless transceiver 430. One or more processors 405 are, in some examples, configured to implement functionality and/or process instructions for execution within the digital signage device 110. For example, the processors 405 may process instructions stored in memory 410 and/or instructions stored on storage devices 415. Such instructions may include components of an operating system 450, communication service application 455, content builder 460, or other software applications 465.

Memory 410 is configured to store information within digital signage device 110 during operation. Memory 410, in some example embodiments, may refer to a non-transitory computer-readable storage medium or a computer-readable storage device. In some examples, memory 410 is a temporary memory meaning that a primary purpose of memory 410 may not be long-term storage. Memory 410 may also refer to a volatile memory, meaning that memory 204 does not maintain stored contents when memory 410 is not receiving power. Examples of volatile memories include RAM, DRAM, SRAM, and other forms of volatile memories known in the art. In some examples, memory 410 is used to store program instructions for execution by the processors 405. Memory 410, in one example, is used by software (e.g., the operating system 450) such as a software, firmware, or middleware for implementing the methods for digital signage as described herein.

One or more storage devices 415 can also include one or more transitory or non-transitory computer-readable storage media and/or computer-readable storage devices. In some embodiments, storage devices 415 may be configured to store greater amounts of information than memory 410. Storage devices 415 may further be configured for long-term storage of information. In some examples, the storage devices 415 include non-volatile storage elements. Examples of such non-volatile storage elements include magnetic hard discs, optical discs, solid-state discs, flash memories, forms of EPROM or electrically erasable and programmable memories, and other forms of non-volatile memories known in the art. For example, storage devices 415 may store vehicle telematics data.

Still referencing to FIG. 4, digital signage device 110 optionally includes one or more optional output devices 420 configured to provide output to users through visual or auditory channels. Output devices 420 may include a video graphics adapter card, liquid crystal display (LCD), light emitting diode (LED) monitor, sound card, speaker, or any other device capable of generating output that may be intelligible to a user. In one example, output device 420 may include static or digital billboard 135.

Digital signage device 110 further includes modem 425 implemented as a network interface for communicating with external devices, or servers via one or more communications networks 225 such as one or more wired, wireless, or optical networks including, for example, the Internet, intranet, LAN, WAN, cellular networks, an IEEE 802.11-based radio frequency network, among others. The modem 425 may include a network interface card, such as an Ethernet card, an optical transceiver, a radio frequency transceiver, or any other type of device that can send and receive information. Other examples of such network interfaces may include Bluetooth®, 3G, 4G, and WiFi® as well as USB.

Similar to above, wireless transceiver 430 is configured to communicate with in-vehicle telematics device 120 using near field communication, Bluetooth® radio, iBeacon® radio, IEEE 802.11-based radio frequency network, and so forth. In some embodiments, wireless transceiver 430 can be separated from other modules of digital signage device 110 but keep the entire functionality substantially the same. In particular, digital signage device 110 can be implemented as a web server, while wireless transceiver 430 can be located at a gasoline station and be embedded, for example, in a gasoline station pump. Similarly, one or more output devices 420 can be separately located from other modules of digital signage device 110.

Operating system 450 may control one or more functionalities of digital signage device 110 and/or components thereof. For example, operating system 450 may interact with applications 465, and may facilitate one or more interactions between them and one or more of processors 405, memory 410, storage devices 415, output devices 420, modem 425, and wireless transceiver 430. As shown in FIG. 4, operating system 450 may interact with or be otherwise coupled to software applications 465 and components thereof. In some embodiments, the applications 465 may be included in operating system 450.

Software implemented applications 465 may execute or facilitate execution of the methods for digital signage as disclosed herein. In particular, communication service 455 may provide API enabling interaction with in-vehicle telematics device 120, server system 210, local resources 220, networked resources 215 or any other third-party web services. For example, communication service 455 can be responsible for acquiring vehicle telematics data from in-vehicle telematics device 120 upon any predetermined triggering event such as a proximity event.

Content builder 460 is configured to render content and build digital signage messages based on vehicle telematics data, predetermined rules and possibly other predetermined or dynamic parameters. Content builder 460 may include multiple sub-modules such as recommendation engine, data integrator, content renderer, data acquisition data, context manager, inventory query service module, customer relationship management (CRM) module, among others.

Digital Signage Method for Advertisements or Recommendations

Figure 5:
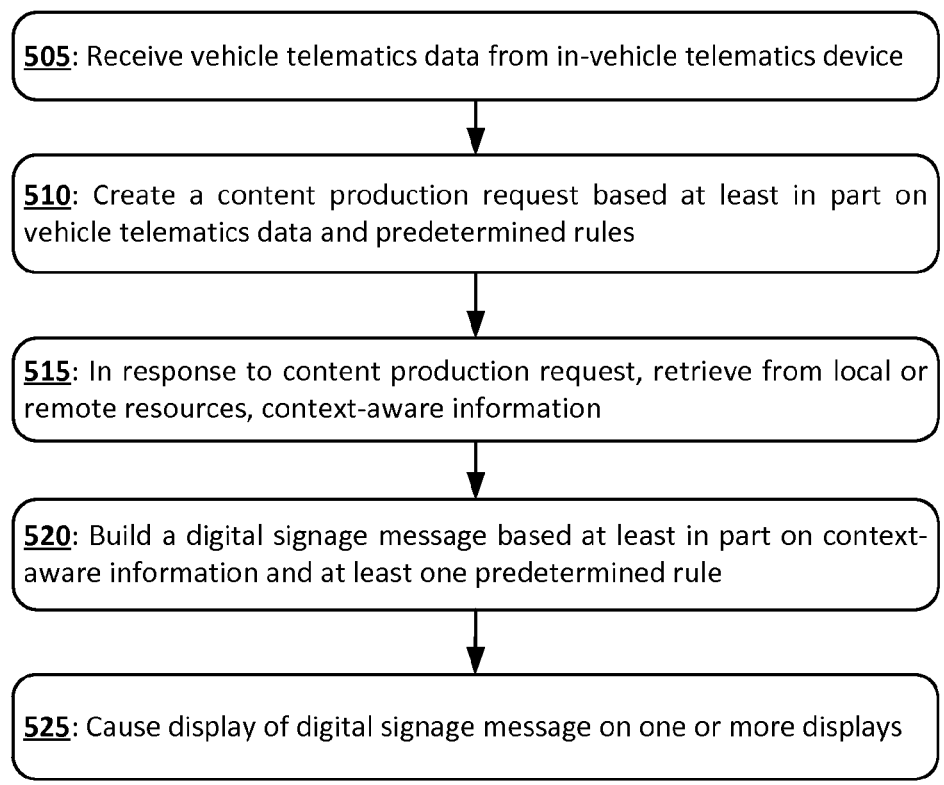
FIG. 5 shows a high-level process flow diagram of a method for digital signage involving advertisements or recommendations, according to one exemplary embodiment.

FIG. 5 shows a process flow diagram of method 500 for digital signage according to one exemplary embodiment. Method 500 may be performed by processing logic that may comprise hardware (e.g., one or more processors, controllers, dedicated logic, programmable logic, and microcode), software (such as software run on a general-purpose computer system or a dedicated machine, firmware), or a combination of both. In some example embodiments, method 500 is implemented by digital signage device 110; however, it should be appreciated that method 500 is just one example operation of digital signage device 110. In other embodiments, method 500 is implemented by server system 210.

Notably, below recited steps of method 500 may be implemented in an order different than described and shown in FIG. 5. Moreover, method 500 may have additional steps not shown herein, but which can be evident from the present disclosure for those skilled in the art. Method 500 may also have fewer steps than outlined below and shown in FIG. 5.

As shown in FIG. 5, method 500 commences at step 505 with digital signage device 110 receiving vehicle telematics data from in-vehicle telematics device 120. As discussed above, vehicle telematics data can be acquired automatically upon detection of a proximity event (such as when vehicle 105 arrives closer than a predetermined distance from digital signage device 110) or any other triggering event depending on a particular implementation and predetermined settings.

Vehicle telematics data shall include at least one of a user identifier associated with vehicle 105 or a vehicle identifier (e.g., VIN number) associated with vehicle 105. In this simple example, digital signage device 110 determines a particular vehicle visited a certain location. This data can be used for statistical purposes, loyalty programs, and conducting financial transactions (e.g., payment for purchased gas or other products or services without the need for the user to use cash or credit cards). In some embodiments, vehicle telematics data may include additional information such as one or more of the following: vehicle make, vehicle model, vehicle year, fuel level, fuel type, oil level, oil type, one or more vehicle error codes, one or more vehicle malfunction alerts, historical data about traveled distances, historical data about traveled directions, and user preferences.

Further, method 500 proceeds to step 510 when digital signage device 110 creates a content production request based at least in part on vehicle telematics data and predetermined rules. The content production request can be then processed locally within the digital signage device 110 and local resources 220 or it can be processed remotely within the server system 210 and remote networked resources 215, or both.

In particular, at step 515, digital signage device 110, in response to the content production request, retrieves from local resource 220 or remote networked resource 215 context-aware information based on the content production request. In some other embodiments, however, context-aware information can be generated before it is retrieved. The generation of context-aware information can be based on a content production request, one or more content management rules, and one or more templates.

Notably, a content production request may include at least a part of the vehicle telematics data. This can be as simple as identified vehicle or user identifier, or it can be a more complex solution such as one including some operating parameters. Furthermore, context-aware information may include one or more of vehicle diagnostics information, an advertisement, promotion coupon, discount, rebate incentive, maintenance recommendation related to vehicle maintenance services, and purchase recommendations related to one or more products or one or more services associated with the vehicle.

Further, at step 520, digital signage device 110 builds a digital signage message based at least in part on the context-aware information and at least one predetermined rule. In particular, a digital signage message can be built so as to include text, images, video, audio, or multimedia content. Depending on a particular application or predetermined rules or message templates, building a digital signage message may include combining context-aware information with predetermined text patterns, and applying predetermined layout patterns, designs, configurations, and so forth. In some instances, building a digital signage message may include incorporation or generation of particular instructions (e.g., API codes) for a remote server to create and deliver a particular digital signage message to a specific billboard 135 or mobile device 230, 235.

At step 525, digital signage device 110 causes display of the digital signage message on one or more displays. In particular, digital signage device 110 may cause display of the digital signage message on the billboard 135. In other embodiments, however, the digital signage message can be displayed on one or more mobile devices 230, 235.

In some embodiments, at step 520, digital signage device 110 can produce two or more digital signage messages. These messages can have the same content or different content. Accordingly, at step 525, a first digital signage message can be sent for display on one display and a second digital signage message can be sent for display on another display. In an example, the first digital signage message can be displayed on a user's mobile device 230, while the second digital signage message is displayed on a mobile device 235 of service provider. The first digital signage message can differ from the second digital signage message so that the first digital signage message may include advertisement content, while the second digital signage message may include vehicle diagnostic data or recommendations for vehicle maintenance.

Accordingly, method 500 provides multiple various ways to deliver digital signage messages to a user (vehicle owner or vehicle driver), entity personnel, or other people involving various context-aware scenarios. In particular, in one example of method 500, it can provide custom advertisement messages to a target audience. Each advertisement message can be unique and reflect the particular potential needs of users. One user may be advised to make a purchase of a specific vehicle oil of particular brand because it can be determined that their oil is to be changed based on acquired vehicle telematics data. Another may be advised to order a particular vehicle maintenance service at local service station because it can be determined that the vehicle operating parameters (e.g., engine exhaust parameters, temperature, malfunction alerts, error codes, etc.) exceed predetermined limit thresholds. Advertisement messages can also be associated with particular locations or entities where digital signage device 110 is located. Thus, once vehicle 105 arrives at gasoline station 130 for refueling, specific advertisements including digital signage messages can be displayed on vertical billboard 135 located nearby.

Digital Signage Method for Loyalty Programs

Figure 6:
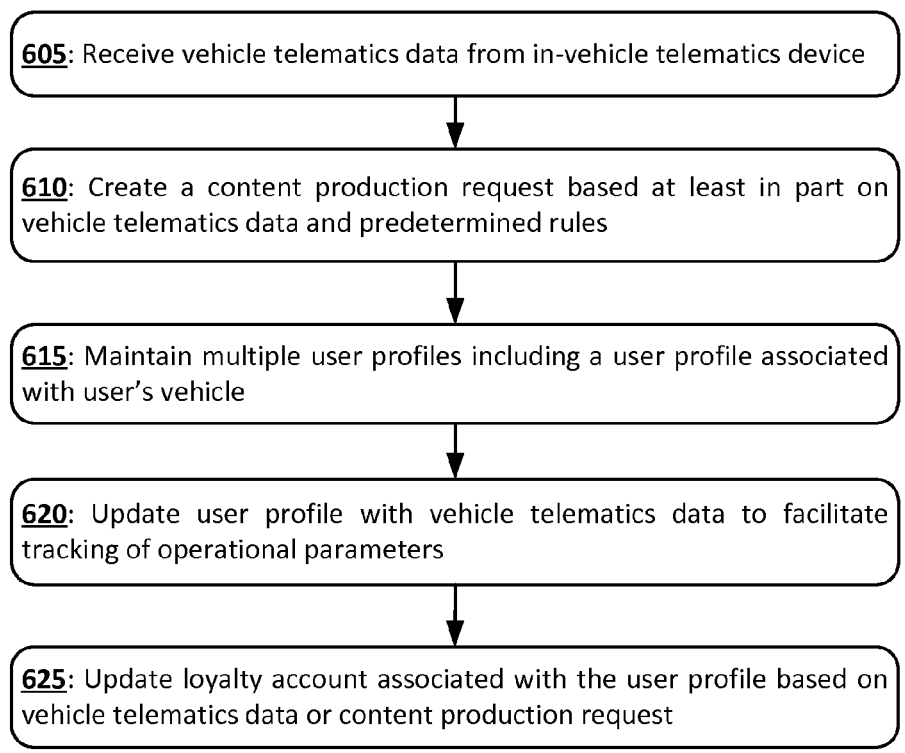
FIG. 6 shows a high-level process flow diagram of a method for digital signage involving loyalty programs, according to one exemplary embodiment.

FIG. 6 shows a process flow diagram of method 600 for digital signage according to one exemplary embodiment. Method 600 may be performed by processing logic that may comprise hardware (e.g., one or more processors, controllers, dedicated logic, programmable logic, and microcode), software (such as software run on a general-purpose computer system or a dedicated machine, firmware), or a combination of both. In some example embodiments, method 600 is implemented by digital signage device 110; however, it should be appreciated that method 600 is just one example operation of digital signage device 110. In other embodiments, method 600 is implemented by server system 210.

Notably, below recited steps of method 600 may be implemented in an order different than described and shown in FIG. 6. Moreover, method 600 may have additional steps not shown herein, but which can be evident for those skilled in the art from present disclosure. Method 600 may also have fewer steps than outlined below and shown in FIG. 6.

As shown in FIG. 6, method 600 commences at step 605 with digital signage device 110 receiving vehicle telematics data from in-vehicle telematics device 120. Vehicle telematics data can be acquired automatically upon detection of a proximity event or any other triggering event depending on a particular implementation and predetermined settings.

At step 610, digital signage device 110 creates a content production request based at least in part on vehicle telematics data and predetermined rules. The content production request can then be processed locally within the digital signage device 110 and local resources 220 or it can be processed remotely within the server system 210 and remote networked resources 215, or both.

At step 615, digital signage device 110 or server system 210 maintains multiple user profiles including a user profile associated with the vehicle 105. Upon receipt of a content production request, a user profile can be automatically identified and accessed.

In general, user profiles can be proprietary or public. For example, in one embodiment, user profiles can include merely vehicle operational parameters facilitating monitoring and tracking operational conditions of a vehicle. Accordingly, at optional step 620, the user profile can be updated with vehicle telematics data to facilitate tracking of operational parameters.

In other embodiments, user profiles can be made public meaning that the user can either create or access his profile via the Internet by visiting a specific website or through a mobile application installed on his mobile device 230. In this case, the user can enhance his user profile by including user preferences, setting or adjusting settings, or any other characteristics.

Further, user profiles can be associated virtually with one or more loyalty programs, incentive programs, or the like. Loyalty programs can encourage users and reward them for loyal buying behavior. Some loyalty programs can include virtual currency or points that are accumulated every time a user makes a purchase or makes any other predetermined action. Points can be later used by users for purchasing goods or services.

Accordingly, each user profile may include or be associated with a loyalty account storing virtual points. In this case, at step 625, digital signage device 110 or server system 210 updates the loyalty account associated with the user profile based on vehicle telematics data or the content production request generated at step 610.

Thus, method 600 allows for engaging customers in loyalty programs, which automatically increase loyalty points based on proximity events, vehicle telematics data, or a content production request. For example, when a digital signage device determines a particular user arriving on his vehicle to a particular parking lot, this event can be sufficient to add a predetermined number of loyalty points to his account.

In other examples, upon detection of a proximity event as discussed above, the digital signage device can send a predetermined message to a server system or particular web resource such as a CRM service. This web service may run a loyalty or marketing campaign causing web resources or digital signage devices to communicate with the user via digital signage messages. In this example, digital signage messages may include promotional coupons or codes, or discount offers to encourage these users to make a particular purchase decision either at a local entity (gasoline station, drive-in restaurant, etc.) or online.

Still referencing to FIG. 6, method 600 may include additional steps as discussed above with reference to FIG. 5. These additional steps may include retrieving (generating) context-aware information, building (generating) digital signage messages based at least in part on context-aware information, user profiles and predetermined rules, and causing display of digital signage messages on one or more displays. It shall be appreciated by those skilled in the art that some steps of method 600 and method 500 can be combined together.

Digital Signage Method for E-Commerce

Figure 7:
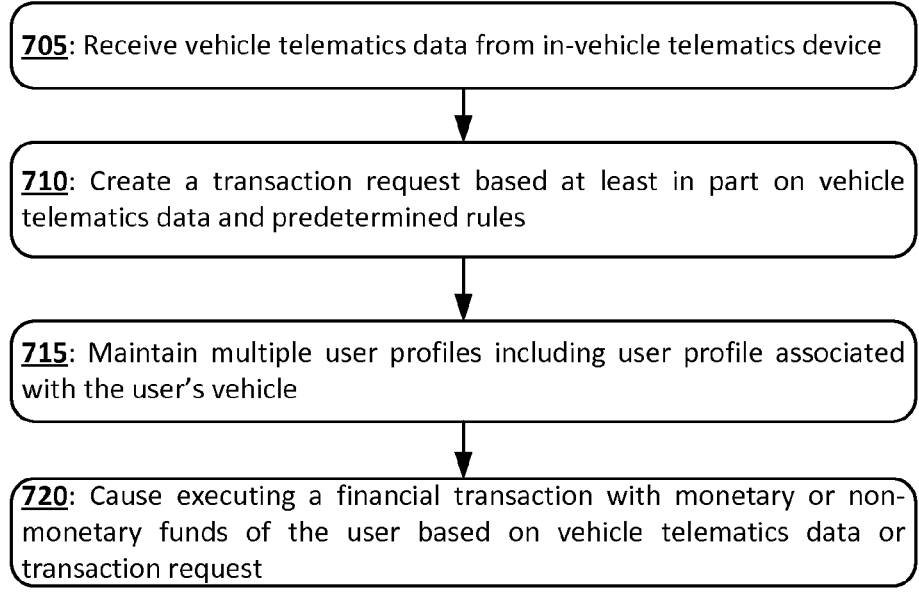
FIG. 7 shows a high-level process flow diagram of a method for digital signage involving e-commerce, according to one exemplary embodiment.

FIG. 7 shows a process flow diagram of method 700 for digital signage, according to one exemplary embodiment. Method 700 may be performed by processing logic that may comprise hardware (e.g., one or more processors, controllers, dedicated logic, programmable logic, and microcode), software (such as software run on a general-purpose computer system or a dedicated machine, firmware), or a combination of both. In some example embodiments, method 700 is implemented by digital signage device 110; however, it should be appreciated that method 700 is just one example operation of digital signage device 110. In other embodiments, method 700 is implemented by server system 210.

Notably, below recited steps of method 700 may be implemented in an order different than described and shown in FIG. 7. Moreover, method 700 may have additional steps not shown herein, but which can be evident from the present disclosure for those skilled in the art. Method 700 may also have fewer steps than outlined below and shown in FIG. 7.

Now, with reference to FIG. 7, method 700 commences at step 705 with digital signage device 110 receiving vehicle telematics data from in-vehicle telematics device 120. Vehicle telematics data can be acquired automatically upon detection of a proximity event or any other triggering event depending on a particular implementation and predetermined settings.

At step 710, digital signage device 110 creates a transaction request based at least in part on vehicle telematics data and predetermined rules. The request can be then processed locally within the digital signage device 110 and local resources 220 or it can be processed remotely within the server system 210 and remote networked resources 215, or both.

At step 715, digital signage device 110 or server system 210 maintains multiple user profiles including a user profile associated with the vehicle 105. Upon receipt of request, a user profile can be automatically identified and accessed.

In this example embodiment, a user profile may be associated with a financial account of the user. For these ends, the user (i.e., vehicle driver or vehicle owner) needs to have a user profile associated with a payment account or credit card. For example, the user profile may include credit card details or other financial-related information and user authorizations enabling financial transactions utilizing the user's debit and credit cards. Accordingly, at step 720, digital signage device 110 or server system 210 causes execution of a financial transaction with monetary or non-monetary funds of the user based on vehicle telematics data or the transaction request.

Thus, method 700 allows for making automated financial transactions upon detection of proximity event and vehicle telematics data. Upon detection of a proximity event, vehicle telematics data can be used to generate a particular request that triggers making a particular financial transaction. The financial transaction may also depend on predetermined parameters such as a schedule of fees, identification of purchased goods or services, amount of purchased goods or services, and so forth. For example, when a user arrives at a parking lot entrance, a proximity event can be detected, a digital signage device will acquire vehicle telematics data, and based on this information, the digital signage device will automatically debit the user's credit card with a parking service fee. Similarly, when the user arrives at a gasoline station and purchases fuel for the vehicle, the digital signage device may automatically debit the user's credit card with a corresponding amount.

Notably, method 700 may include additional steps as discussed above with reference to FIGS. 5 and 6. These additional steps may include retrieving (generating) context-aware information, building (generating) digital signage messages based at least in part on context-aware information, user profiles and predetermined rules, and causing display of digital signage messages on one or more displays. It shall be appreciated by those skilled in the art that some steps of method 700, method 600 and method 500 can be combined together.

In yet further embodiments, digital signage methods discussed herein can be further used for collecting statistical information. This statistical information may include information on purchase decisions, as well as time and date of visits or purchases. Accordingly, this statistical information can be helpful for evaluating product ratings and popularity parameters, which can be location-aware and/or attached to statistics about specific vehicle models. For example, end users will see that this specific liquid or vehicle part from the e-commerce catalog has that specific rating in that specific location.

CONCLUSION

Thus, systems and methods for digital signage have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for digital signage, comprising:
    detecting, by a computing device having at least one processor and memory storing processor-readable instructions, a proximity-based event associated with a vehicle of a user;
    receiving, by the computing device, vehicle telematics data from an in-vehicle telematics device, wherein the vehicle telematics data is associated with the vehicle;
    creating, by the computing device, a content production request based on the vehicle telematics data;
    retrieving, by the computing device, from a local database or a remote networked resource, context-aware information based on the content production request;
    creating, by the computing device, a first digital signage message based on the context-aware information, vehicle telematics data, and at least one predetermined rule;
    creating, by the computing device, a second digital signage message based on the context-aware information, vehicle telematics data, and at least one predetermined rule, wherein the first digital signage message differs from the second digital signage message, and wherein both the first digital signage message and the second digital signage message are associated with the proximity-based event;
    causing, by the computing device, display of the first digital signage message on a first display, wherein the first display is associated with the user or the vehicle; and
    causing, by the computing device, display of the second digital signage message on a second display, wherein the second display differs from the first display, and wherein the second display is not associated with the user or the vehicle.

2. The method of claim 1, wherein the vehicle telematics data includes at least one of a user identifier associated with the vehicle or a vehicle identifier associated with the vehicle.

3. The method of claim 1, wherein the vehicle telematics data includes at least one of historical data concerning traveled distances; and historical data concerning traveled directions, and wherein the vehicle telematics data optionally includes one or more of the following: a vehicle make, a vehicle model, a fuel level, a fuel type, one or more vehicle error codes, one or more vehicle malfunction alerts, user preferences.

4. The method of claim 1, wherein the receiving of the vehicle telematics data is performed automatically when the vehicle is located within a predetermined distance of the computing device or a wireless transceiver.

5. The method of claim 1, wherein the content production request includes at least part of the vehicle telematics data.

6. The method of claim 1, wherein the context-aware information comprises vehicle diagnostics information.

7. The method of claim 1, wherein the context-aware information comprises an advertisement.

8. The method of claim 1, wherein the context-aware information comprises a maintenance recommendation related to vehicle maintenance services.

9. The method of claim 1, wherein the context-aware information comprises a purchase recommendation related to one or more products or one or more services associated with the vehicle.

10. The method of claim 1, wherein the second display includes at least one digital billboard not associated with the vehicle or the user.

11. The method of claim 1, wherein the first display includes at least one of: a first handheld computing device, an in-vehicle computer, or a first mobile terminal, and wherein the second display includes at least one of a second handheld computing device or a second mobile terminal.

12. The method of claim 1,
    wherein the first digital signage message and the second digital signage message are associated with the vehicle.

13. The method of claim 1, further comprising:
    maintaining, by the computing device or a networked resource, a user profile associated with the vehicle; and
    updating, by the computing device or the networked resource, the user profile with the vehicle telematics data.

14. The method of claim 13, further comprising updating, by the computing device or the networked resource, a loyalty account associated with the user profile based on the vehicle telematics data or the content production request.

15. The method of claim 13, wherein the creating of the digital signage message is further based on the user profile.

16. The method of claim 13, further comprising causing, by the computing device or the networked resource, execution of a financial transaction with monetary or non-monetary instruments of the user based on the vehicle telematics data or the content production request.

17. The method of claim 1, further comprising generating, by the computing device or a networked resource, the context-aware information based on the content production request, one or more content management rules, and one or more templates.

18. A digital signage system, comprising:
    a computing device including at least one processor and a memory storing processor-executable codes, wherein the computing device is configured to:
    detect a proximity-based event associated with a vehicle of a user;
    receive vehicle telematics data from an in-vehicle telematics device, wherein the vehicle telematics data is associated with the vehicle;
    create a content production request based on the vehicle telematics data;
    retrieve from a local database or a remote networked resource, context-aware information based on the content production request;
    create a first digital signage message based on the context-aware information, vehicle telematics data, and at least one predetermined rule;
    create a second digital signage message based on the context-aware information, vehicle telematics data, and at least one predetermined rule, wherein the first digital signage message differs from the second digital signage message, and wherein both the first digital signage message and the second digital signage message are associated with the triggering event;

cause display of the first digital signage message on a first display, wherein the first display is associated with the user or the vehicle;

cause display of the second digital signage message on a second display, wherein the second display differs from the first display, and wherein the second display is not associated with the user or the vehicle.

19. A non-transitory processor-readable medium having instructions stored thereon, which when executed by one or more processors, cause the one or more processors to implement a method, comprising:

detecting a proximity-based event associated with a vehicle of a user;

receiving vehicle telematics data from an in-vehicle telematics device, wherein the vehicle telematics data is associated with the vehicle;

creating a content production request based on the vehicle telematics data;

retrieving from a local database or a remote networked resource, context-aware information based on the content production request;

creating a first digital signage message based on the context-aware information, vehicle telematics data, and at least one predetermined rule;

creating a second digital signage message based on the context-aware information, vehicle telematics data, and at least one predetermined rule, wherein the first digital signage message differs from the second digital signage message, and wherein both the first digital signage message and the second digital signage message are associated with the proximity-based event;

causing display of the first digital signage message on a first display, wherein the first display is associated with the user or the vehicle;

causing display of the second digital signage message on a second display, wherein the second display differs from the first display, and wherein the second display is not associated with the user or the vehicle.

* * * * *